Figure 1:
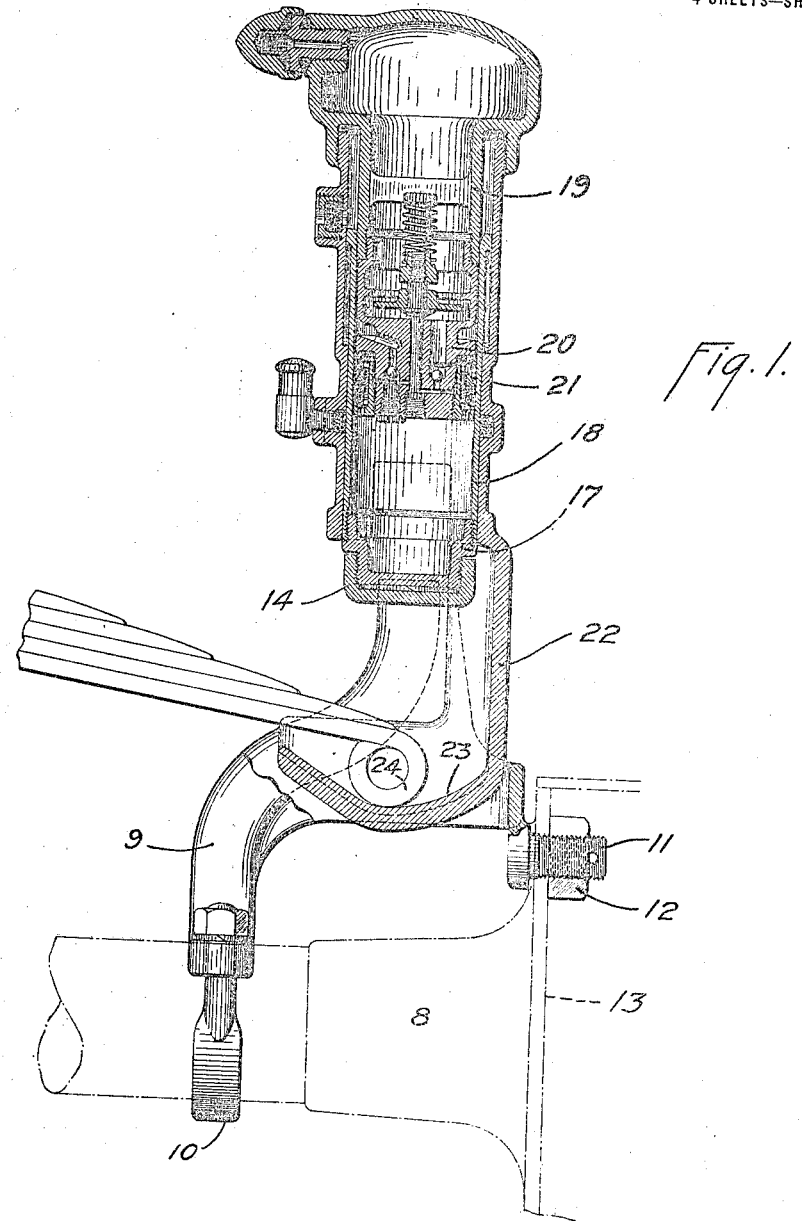

R. LIEBAU.
SUPPLEMENTAL SPRING.
APPLICATION FILED JUNE 30, 1915.

1,282,887.

Patented Oct. 29, 1918.
4 SHEETS—SHEET 1.

WITNESSES

INVENTOR.
Richard Liebau
BY
HIS ATTORNEY IN FACT

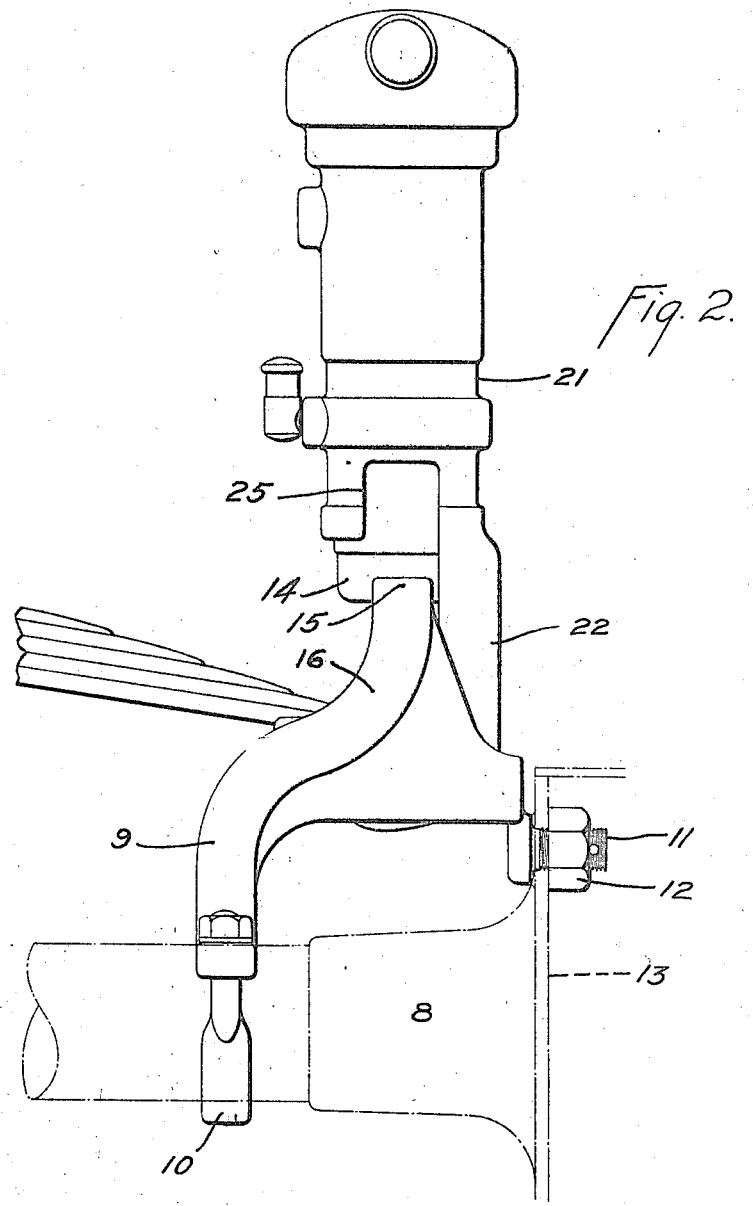

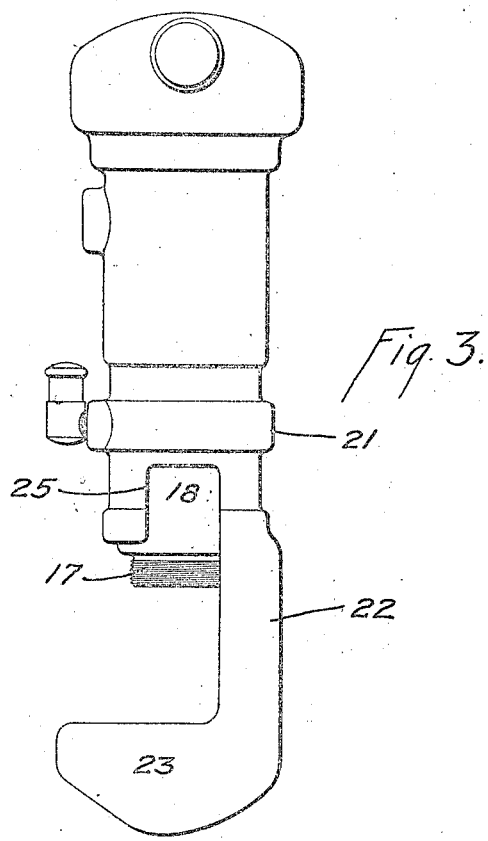

R. LIEBAU.
SUPPLEMENTAL SPRING.
APPLICATION FILED JUNE 30, 1915.
1,282,887.
Patented Oct. 29, 1918.
4 SHEETS—SHEET 4.
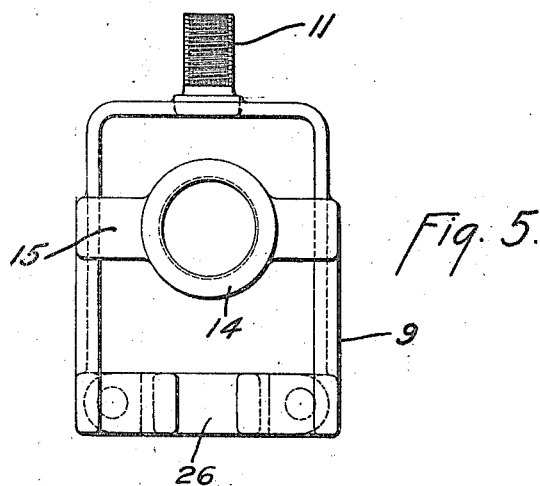
Fig. 5.
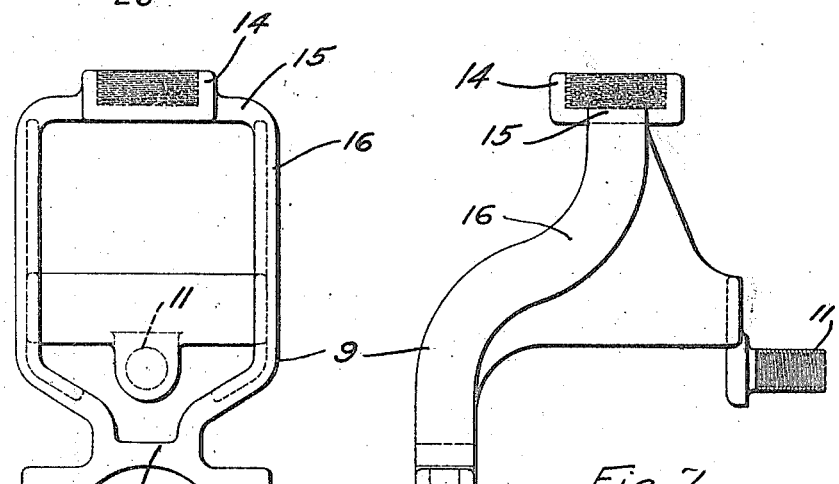
Fig. 6.
Fig. 7.
WITNESSES:
INVENTOR
Richard Liebau
BY
HIS ATTORNEY IN FACT.

UNITED STATES PATENT OFFICE.

RICHARD LIEBAU, OF NEW HAVEN, CONNECTICUT, ASSIGNOR TO THE WESTINGHOUSE AIR SPRING COMPANY, A CORPORATION OF PENNSYLVANIA.

SUPPLEMENTAL SPRING.

1,282,887.        Specification of Letters Patent.    Patented Oct. 29, 1918.

Application filed June 30, 1915. Serial No. 37,209.

*To all whom it may concern:*

Be it known that I, RICHARD LIEBAU, a citizen of the United States, and a resident of New Haven, in the county of New Haven and State of Connecticut, have made a new and useful Invention in Supplemental Springs, of which the following is a specification.

This invention relates to supplemental springs for use with the leaf springs of vehicles such as automobiles.

In an application filed by George Westinghouse on February 21, 1912, and serially numbered 679,029 a vehicle air spring is shown, and this invention relates more particularly to the means for applying such an air spring to a vehicle utilizing leaf springs in which the lower leaf is the main leaf, such as in certain forms of cantaliver springs and the springs used on the Ford car.

An object of this invention is to produce efficient means for mounting supplemental telescopic springs between the vehicle running gear and the ends of the leaf springs connected with the vehicle load platform. This, as well as other objects, which will readily appear to those skilled in this art, I accomplish by means of the device illustrated in the drawings accompanying the specification and forming part of this application and throughout which similar elements are denoted by like characters.

In the drawings, Figure 1 is a view partially in sectional elevation of a device embodying this invention;

Fig. 2 is an outline drawing of the same; and

Figs. 3, 4, 5, 6, and 7 are detail views of portions of the device.

For the purposes of this application, I have shown this invention applied to a Ford car, but without any intention, however, of limiting its use to such a car.

In the drawings, 8, which is in dotted line, represents the rear axle of a Ford car and to this a bracket 9 is secured by means of a clip 10 bolted thereto and which surrounds the axle, and by means of a steadying stud 11 and nut 12. The steadying stud 11 projects through the brake drum flange 13 and the nut 12 is located on the inside of the brake drum. The bracket 9 is shown in detail in Figs. 5, 6 and 7 and is provided at its top with an internally threaded boss 14 carried by a cross member 15 supported by the uprights 16. Screwed in the boss 14 is the bottom 17 of one member 18 of the telescopic air spring.

In a general way the air spring consists of member 18, a member 19 telescoping within member 18 and carrying a plunger head 20, and provided with valves and pumping mechanism. Surrounding member 18 is a guard member or cylinder 21 and this at its lower end is provided with a depending foot 22 formed into a saddle 23 for the reception of one end 24 of the leaf spring. Guard 21 is slotted, as shown in Figs. 2 and 3, at 25, so as to accommodate uprights 16 during the compression and extension movements of the air spring.

The lower inner surface of saddle 23 is approximately V shaped, the facing being arched to allow the leaf spring to roll a limited amount with reference to the axle 8 so as to prevent binding between the steel spring and the air spring. The V form given to the saddle is such as to prevent undue swaying of the vehicle body. In assembling the device the air spring with the depending saddle as illustrated in Fig. 3 is tipped to such a position that the saddle may be inserted into the opening between uprights 16, the under face of boss 14, and cross member 26, so that when inserted and straightened the lower threaded end 17 may be screwed into boss 14 so as to make bracket 9 and cylinder 18 of the air spring one member.

When installed on the car as shown in Figs. 1 and 2 and the air spring has been pumped to the proper pressure to support the vehicle body or load platform in normal mid position, the parts will take the position shown in Figs. 1 and 2.

It will be seen that instead of an air spring an ordinary spiral compression steel spring may be substituted. If this is done, a cylindrical guide for retaining the steel spring in position can be secured to boss 14 and an outer or dust guard similar to guard 21 having the same depending saddle can be utilized.

In accordance with the provisions of the patent statutes I have described the principle of operation of my invention together with the device which I now consider to represent the best embodiment thereof, but I desire to have it understood that the device shown is only illustrative and that the invention can be carried out in other ways.

Having thus described my invention, what I claim is:

1. The combination with a vehicle running gear, of a leaf spring, the lower leaf of which is the main leaf and a supplemental spring carried by the running gear and having a saddle located below itself and within which one end of said leaf spring is slidably mounted.

2. The combination with a vehicle running gear, of a leaf spring and a telescopic air spring, one member of which is secured to the running gear and the other member of which is provided with a depending saddle within which one end of the leaf spring rides.

3. A telescopic air spring one member of which is secured to the running gear and the other member of which is provided with a depending saddle within which one end of the leaf spring rides.

4. The combination with a vehicle running gear, of a leaf spring the lower leaf of which is the main leaf and a supplemental spring, one member of which is secured to the running gear and the other member of which is provided with a depending saddle within which one end of the leaf spring slides.

5. A telescopic air spring having a cylinder adapted to be secured to the running gear of a vehicle, a plunger head telescopically arranged within the said cylinder and a saddle connected to said plunger head and provided with a seat for one end of the vehicle steel spring.

6. A telescopic air spring having one member adapted to be secured to the running gear of the vehicle and another member telescoping with the said first member and provided with a seat constructed and arranged to slidably receive the end of a leaf spring.

7. In combination with a vehicle axle, a support secured thereto, one member of a telescopic spring carried by said support, another member of said telescopic spring telescopically arranged with relation to said first member and carrying a saddle provided with a seat, constructed and arranged to slidably receive the end of a leaf spring.

8. In combination with a vehicle axle, a support secured to said axle, a telescopic spring, one member of which is secured to said support and one member of which is provided with a depending saddle, constructed and arranged to slidably receive the end of a steel spring, and a steel spring so arranged that one end thereof slides within said saddle.

In testimony whereof I have hereunto subscribed my name this 28th day of June, 1915.

RICHARD LIEBAU.

Witnesses:
  J. EDWARD BIGGS,
  MARY M. HALPIN.